United States Patent
Sato et al.

[11] Patent Number: 6,104,980
[45] Date of Patent: Aug. 15, 2000

[54] VEHICULAR OPERATION PROCESSING SYSTEM

[75] Inventors: Hideki Sato, Kasugai; Hideki Sako, Kariya, both of Japan

[73] Assignee: Denso Corporation, Kariya, Japan

[21] Appl. No.: 09/026,670

[22] Filed: Feb. 20, 1998

[30] Foreign Application Priority Data

Feb. 21, 1997 [JP] Japan ..................................... 9-037551

[51] Int. Cl.[7] .............................. G01S 21/00; E01H 4/00; G08G 1/123

[52] U.S. Cl. ................................ 701/211; 701/1; 701/23; 701/200; 73/178 R; 37/196; 37/232; 340/988

[58] Field of Search ................................... 701/200, 206, 701/207, 211, 212, 201, 23; 73/178 R; 37/196, 197, 232, 235; 340/988, 990, 995; 342/450

[56] References Cited

U.S. PATENT DOCUMENTS 5,752,217  5/1998  Ishizaki et al. ........................... 701/201
5,774,073  6/1998  Maekawa et al. ....................... 340/995
5,793,631  8/1998  Ito et al. .................................. 701/211

FOREIGN PATENT DOCUMENTS 53-048582  5/1978  Japan.
6-137880   5/1994  Japan.

OTHER PUBLICATIONS

Pamphlet for AVOC (Advanced Vehicle Operation System) published Jul. 1995, (see abstract).
Pamphlet for AVOS (Advanced Vehicle Operation System) published Jul. 1995, (see abstract).

*Primary Examiner*—William A. Cuchlinski, Jr.
*Assistant Examiner*—Yonel Beaulieu
*Attorney, Agent, or Firm*—Pillsbury Madison & Sutro LLP

[57] ABSTRACT

A vehicular operation processing system has a memory card for storing coordinates of a plurality of check point sets, each of which is composed of a set of check points, and an ECU for, when determining that a vehicle has approached to any one of the check point sets based on the coordinate of a current vehicle position and the coordinate of the check point set, detecting a next check point based on a relation between each of check points contained in that check point set and a check point detected in the last time and performing associated processes such as a voice guidance and automatic sampling of operation record for that check point.

33 Claims, 11 Drawing Sheets

CHECK POINT CONTROL TABLE

| # | CHECK POINT | COORDINATE | SMALL RADIUS $r_1$ | LARGE RADIUS $r_2$ |
|---|---|---|---|---|
| $P_0$ | a, b, ··· | $(x_0, y_0)$ | 100 | 200 |
| $P_1$ | e, f, ··· | $(x_1, y_1)$ | 120 | 220 |
| $P_2$ | i, j, ··· | $(x_2, y_2)$ | 100 | 200 |
| ⋮ | ⋮ | ⋮ | ⋮ | ⋮ |
| $P_n$ | y, z, ····· | $(x_n, y_n)$ | 110 | 210 |

MOVABLE RELATION TABLE

| STARTING POINT | ENDING POINT | COST |
|---|---|---|
| a | c | 10 |
| c | e | 9 |
| ⋮ | ⋮ | ⋮ |
| x | z | 15 |

FIG. 17

CHECK POINT ASSOCIATED PROCESS TABLE

| CHECK POINT | ASSOCIATED PROCESS |
|---|---|
| a | VOICE GUIDANCE FOR "a" |
| ⋮ | |
| z | VOICE GUIDANCE FOR "z" |

FIG. 18 even if the snowplow runs in various ways as described above. Then, because the next check point is detected based on the relation between each of the check points contained in the check point set and the check point detected in the last time, the next check point may be detected accurately in correspondence with the travel of the snowplow.

VEHICULAR OPERATION PROCESSING SYSTEM

CROSS REFERENCE TO RELATED APPLICATION

This application is based upon and claims the benefit of priority of prior Japanese Patent Application No. H. 9-37551 filed on Feb. 21, 1997, the contents of which are incorporated herein by reference.

BACKGROUND OF THE INVENTION

1. Field of the Invention

The present invention relates to a vehicular operation processing system which is mounted in a vehicle, for example, utilized for removal of snow (hereinafter referred to as a snowplow) and which performs associated processes such as a voice guidance for a check point and automatic sampling of operation records when the vehicle approaches the check point.

2. Description of Related Art

It is prohibited for the snowplow to dump removed snow from an expressway or the like at a section crossing with an underpassing general road. The driver is also required to lift a snowremoving machine at a section passing over a river because there is a bridge joint. It is also necessary to memorize check points in creating operation records while removing snow. Accordingly, it is desirable to set various check points including the snow dumping prohibited sections and the bridge joints in advance and to be able to carry out associated processes such as a voice guidance for the check point and automatic sampling of operation records when the snowplow approaches any one of the check points.

In this case, it is conceivable to determine that the snowplow is approaching the check point by detecting a current vehicle position with the GPS (Global Positioning System) used in a vehicular navigation system. However, it is difficult to accurately determine the approach to the check point because of errors in detecting the current vehicle position and the snowplow on an expressway often travel in directions different from that of the normal vehicles. For instance, the snowplow is required to run in various ways in addition to traveling in the normal direction of traffic in the lanes. For example, it may travel in an opposite direction to the traffic in the main lane, drive around a vehicle station within an interchange or run by making a U-turn from an up (down) lane to a down (up) lane by utilizing the interchange. Normal vehicles will never drive in such ways, thus making it is difficult to deal with determining the approach of snow plows to a check point by using the vehicular navigation system.

It is noted that other vehicles driving in various ways as described above, include a police car, a fire engine, an ambulance, a road maintenance car and the like, beside the snowplow.

The present invention has been made based on the above-mentioned background and its object is to accurately detect that a vehicle such as a snowplow is approaching a check point to perform the associated processes with respect to the check point.

It is another object of the invention to perform the associated processes such as voice guidance, automatic sampling of operation records and the like with respect to the check points peculiar to the snowplow such as the snow dumping prohibited sections and bridge joints.

SUMMARY OF THE INVENTION

In order to achieve the aforementioned object, a vehicular operation processing system of the present invention comprises a storing device for setting a plurality of check point sets each of which is composed of a set of check points and storing coordinates of the plurality of check point sets, respectively, and a processing device for, when it is determined that a vehicle has approached to any one of the check point sets based on the coordinate of a current vehicle position and the coordinate of the check point set, detecting a next check point based on a relation between each of check points contained in that check point set and a check point detected in the last time and performing associated processes for that check point.

Because the concept of the check point set composed of a set of check points is introduced and the approach of the vehicle, e.g. a snowplow, to any one of the check point sets is determined based on the coordinate of the check point set and the coordinate of the current vehicle position, the approach to the check point set may be accurately determined even if the snowplow runs in various ways as described above. Then, because the next check point is detected based on the relation between each of the check points contained in the check point set and the check point detected in the last time, the next check point may be detected accurately in correspondence with the travel of the snowplow.

In the vehicular operation processing system described above, the check point set of the area in which the current vehicle position is contained may be quickly retrieved by using data of hierarchical structure arranged such that respective small areas obtained by subdividing a predetermined area are specified by coordinates and the check point set corresponds to the lowest level area.

It is preferable to determine that the snowplow has approached the check point set when the current vehicle position enters within a first distance from the coordinate of the check point set and to determine that the snowplow has passed through the check point set when the current vehicle position is distant by more than a second distance which is greater than the first distance from the coordinate of the check point set. It allows to prevent the determination of the approach of the current vehicle position entering within the first distance from the check point set from being repeatedly performed due to an error in detecting the current vehicle position and thereby to prevent the associated processes for the check point from being repeatedly performed. It is noted that the first and second distances are set per check point set.

It is also possible to detect the next check point based on cost calculation between each of check points contained in the check point set and a check point detected in the last time. It allows to detect the optimum check point in correspondence with the travel of the snowplow to be detected.

When the vehicle is a snowplow, it is preferable to arrange the system so as to determine that the snowplow is approaching to a snow dumping prohibited section and to perform the associated processes for the snow dumping prohibited section. It allows the associated processes for the snow dumping prohibited section to be performed precisely.

It is also preferable to arrange the system so as to determine that the snowplow is approaching to a bridge joint and to perform the associated processes for the bridge joint. It also allows the associated processes for the bridge joint to be performed precisely.

BRIEF DESCRIPTION OF DRAWINGS

Other objects, features and advantages of the present invention will be made more apparent by the following detailed description with reference to the accompanying drawings. In the drawings.

DESCRIPTION OF PREFERRED EMBODIMENT

A preferred embodiment of the present invention will be explained with reference to the drawings.

Figure 1:
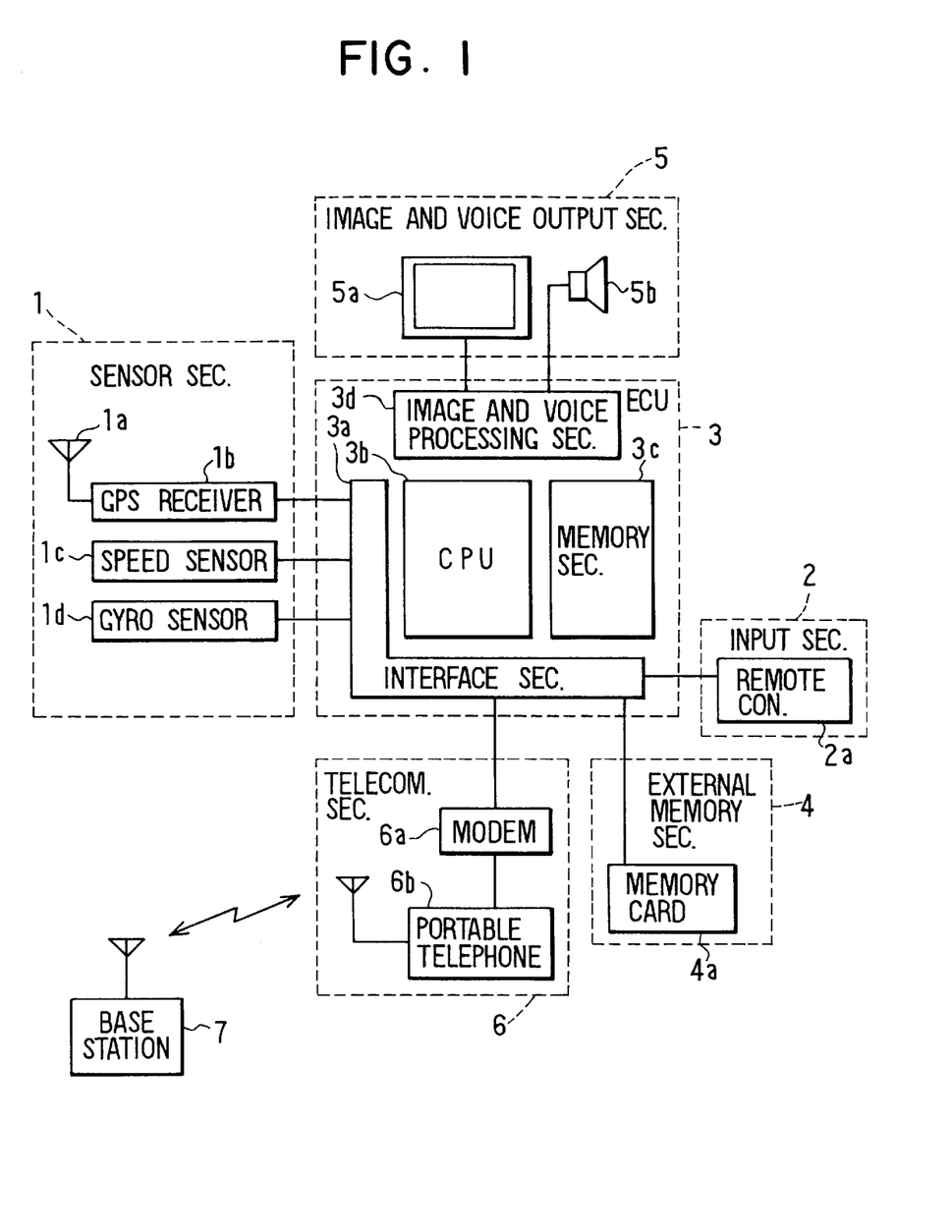
FIG. 1 is a diagram showing an entire structure of a snowplow operation processing system according to a first embodiment of the present invention.

FIG. 1 is a diagram showing an entire structure of a snowplow operation processing system according to the embodiment of the present invention. The system comprises a sensor section 1, an input device section 2, an electronic control unit (hereinafter referred to as an ECU) 3, an external memory section 4, an image and voice output section 5 and a telecommunication section 6.

The sensor section 1 comprises a GPS antenna 1a, a GPS receiver 1b, a car speed sensor 1c and a gyro sensor 1d. The GPS receiver 1b receives radio waves from satellites by way of the GPS antenna 1a and outputs a signal indicating a current position of the snowplow. The car speed sensor 1c outputs a signal corresponding to a traveling speed of the snowplow. The gyro sensor 1d outputs a signal corresponding to a turning angle of the snowplow. Based on these signals, a computer processing section (hereinafter referred to as a CPU) within the ECU 3 finds a coordinate representing the current position of the snowplow.

The ECU 3 comprises an interface section 3a for executing input/output processes with the sensor section 1, the input device section 2, the external memory section 4 and the communication section 6, the CPU 3b for executing associated processes such as a voice guidance for a check point and automatic sampling of operation records in removing snow, a memory section 3c for storing programs and various data necessary for the computation and an image and voice processing section 3d for creating signals for outputting images and voice.

The input device section 2 is composed of a remote controller 2a which is controlled by a driver and which outputs a control signal. The external memory section 4 is composed of a memory card 4a for storing various external data necessary for the operation processing of the snowplow. The image and voice output section 5 comprises an image display 5a for displaying images and a speaker 5b for outputting voice.

The telecommunication section 6 comprises a modem 6a and a portable telephone 6b and is used in communicating with a base station 7. For instance, it is used in transmitting the operation records automatically sampled to the base station 7.

Next, a method to detect the check point for which the associated processes such as the voice guidance and the automatic sampling of operation records are performed will be explained.

A snowplow is required to run on an expressway in various ways in addition of driving in the normal direction in a main lane when removing snow. That is, it may drive in the reverse direction in the main lane, drive around a vehicle station within an interchange or drive by making a U-turn from an up (down) lane to a down (up) lane by utilizing an interchange. The current vehicle position found based on the signals from the sensor section 1 may also contain an error.

Then, taking these factors into consideration, a concept of a check point set which is composed of a set of check points is adopted. The check point set is set at various points on the expressway in the present embodiment. The check point set is a set of check points which are exclusive to each other, e.g., a set of check points which are located on the both sides of an up lane and a down lane of an expressway where a vehicle cannot be positioned concurrently, and which are put together by taking an error in detecting the current vehicle position into consideration. When the snowplow approaches either one of the check point sets, a correct check point is detected from that check point set.

Figure 2:
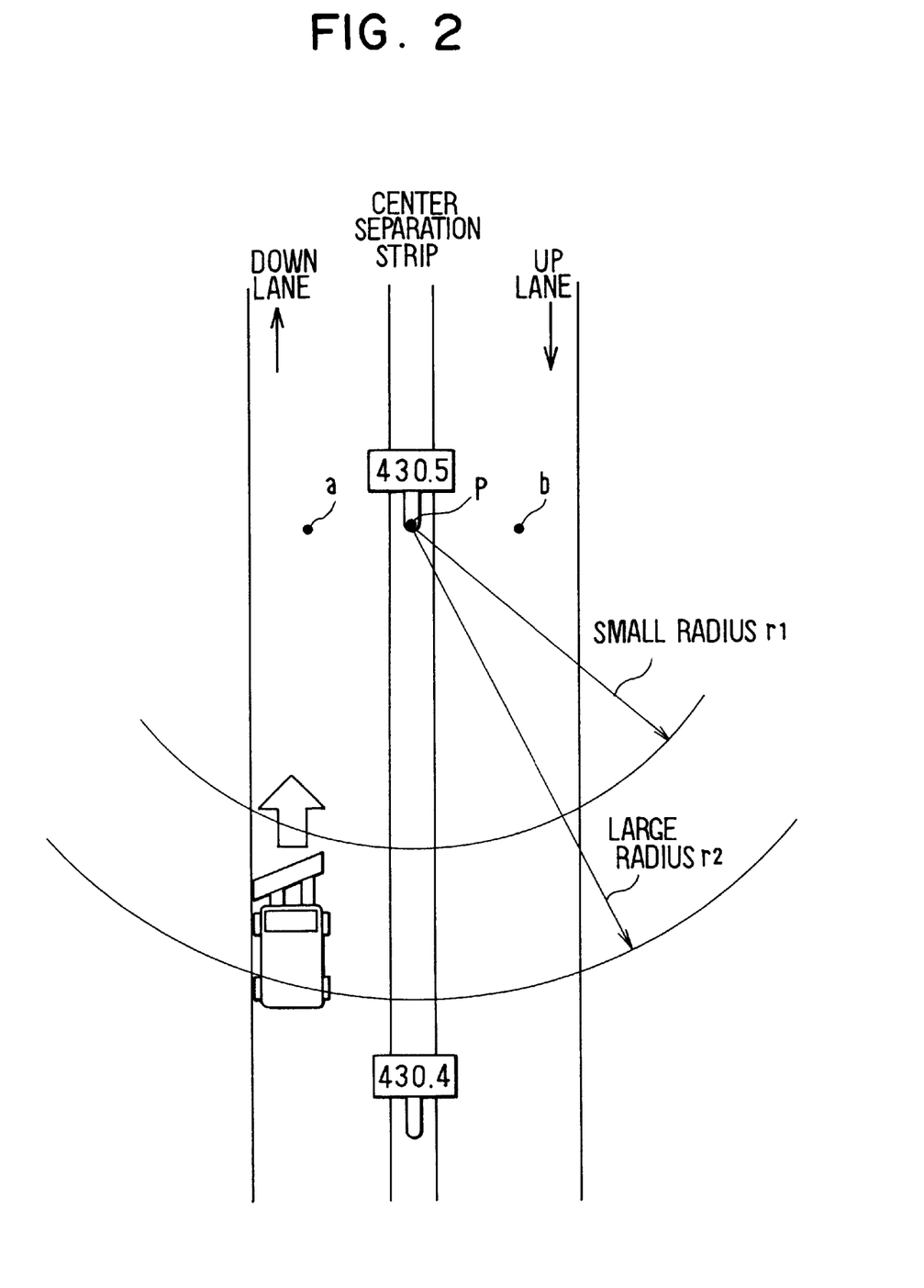
FIG. 2 is a diagrammatic view for explaining a case of detecting a desirable check point among a set of check points when a snowplow approaches to the set of check points.

Assume that distance indication posts are provided each predetermined distance in a center separation strip (median strip) in an expressway and the coordinate of a check point set P is set at the distance indication post of "430.5" in FIG. 2. When the snowplow enters within a range of radius $r_1$ (small radius $r_1$) from the check point set P, a correct check point is detected as either one of the check points (a) and (b) contained in the check point set P. In this case, costs from a check point detected in the last time with respect to the check points (a) and (b) are calculated and a check point to which the cost is minimum is set as the next check point (correct check point). In a case of FIG. 2, the cost to the check point (a) is minimum because the check point detected in the last time is on the down lane, so that the check point (a) is detected as the next check point. Then, the associated processes such as the voice guidance and the automatic sampling of operation records are performed with respect to the check point (a).

It is noted that although the approach to the check point set P is determined when the snowplow enters within the range of the small radius $r_1$ from the check point set P, the approach to the same check point set P is not determined again, after the above-mentioned determination, until it is determined that the snowplow has got out of the range of a large radius $r_2$ ($>r_1$) from the check point set P and has passed through the check point set P. This processing is made to eliminate troubles of determining that the snowplow has entered within the range of radius $r_1$ several times by erroneously detecting the current vehicle position when the snowplow is located around the radius $r_1$ from the check point set P and of performing the associated processes such as the voice guidance and the automatic sampling of operation records in each time.

Figure 3:
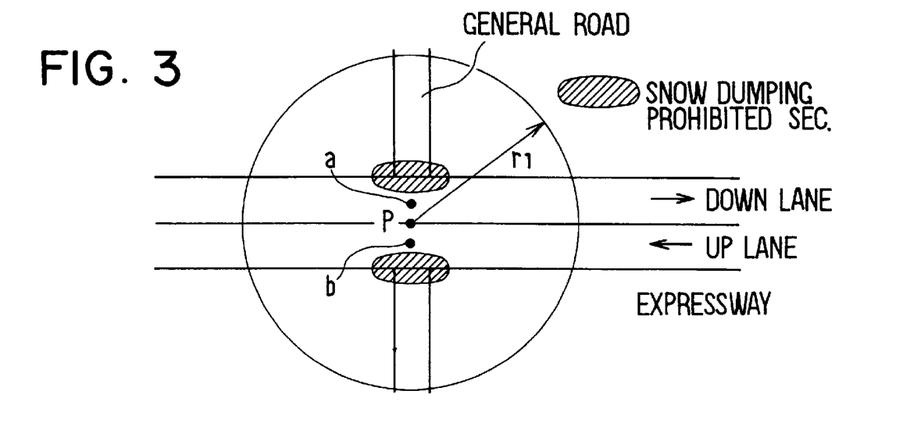
FIG. 3 is a diagrammatic view for explaining a case when a snow dumping prohibited section is set as a check point.

FIG. 3 shows a case when a snow dumping prohibited section is set as a check point. Because it is prohibited to dump removed snow at sections where there is a solid crossing of the expressway and a general road, the voice guidance is given informing of such a snow dumping prohibited section and its operation record is created when it is detected that the snowplow is approaching to the check point (a) in traveling the down lane or when it is detected that the snowplow is approaching to the check point (b) in traveling the up lane. Accordingly, it is possible to give a caution of the snow dumping prohibited section to the driver by informing the driver of the snow dumping prohibited section by the voice guidance.

Figure 4:
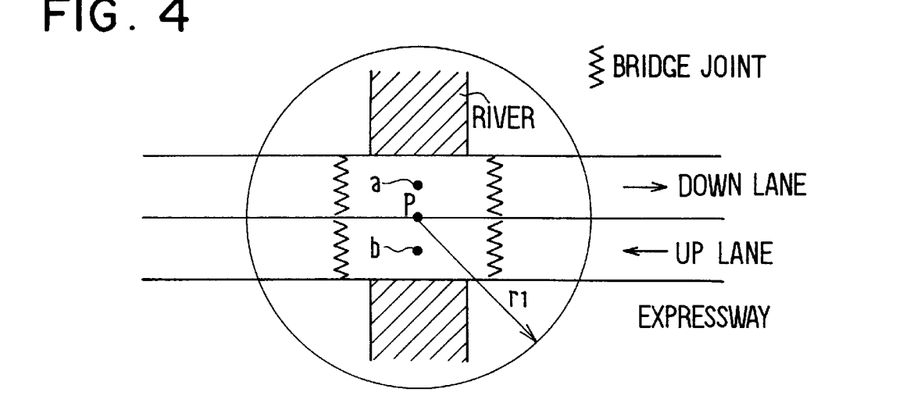
FIG. 4 is a diagrammatic view for explaining a case when a bridge joint is set as a check point.

FIG. 4 shows a case when a bridge joint is set as a check point. Because there is a bridge joint at a section passing over a river, the voice guidance is given informing of such a bridge joint and its operation record is created when it is detected that the snowplow is approaching the check point (a) in traveling the down lane or when it is detected that the snowplow is approaching the check point (b) in traveling the up lane. Accordingly, it is possible to give a caution of the bridge joint to the driver by informing the driver of the bridge joint by the voice guidance.

Figure 5:
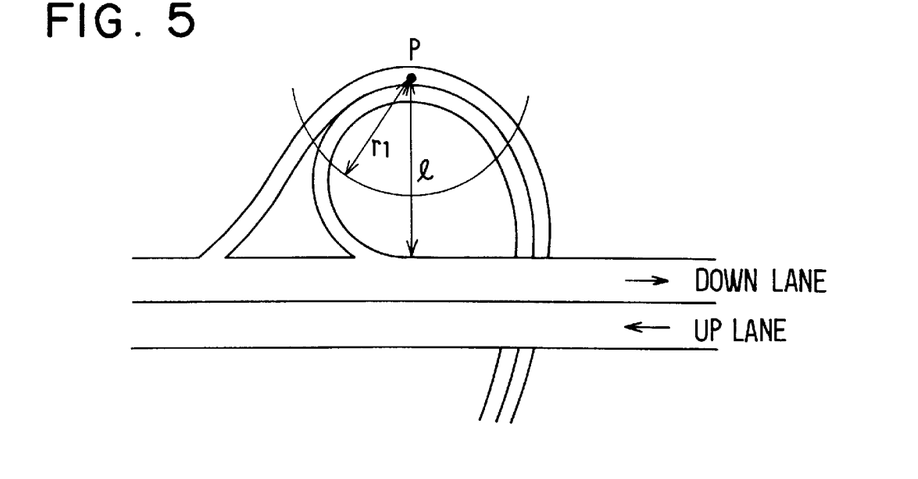
FIG. 5 is a diagrammatic view for explaining a case when a check point is set on a ramp.

It is noted that the check point set P may be also set on a ramp of an interchange as shown in FIG. 5, beside the main lane of an expressway. In this case, a small radius $r_1$ used for determining the approach is set smaller than a distance from the check point set P to the main lane of the expressway in order to prevent the snowplow traveling on the main lane of the expressway from being erroneously determined to be approaching to the check point set P.

Next, a detailed structure for detecting the check point described above will be explained.

Figure 6:
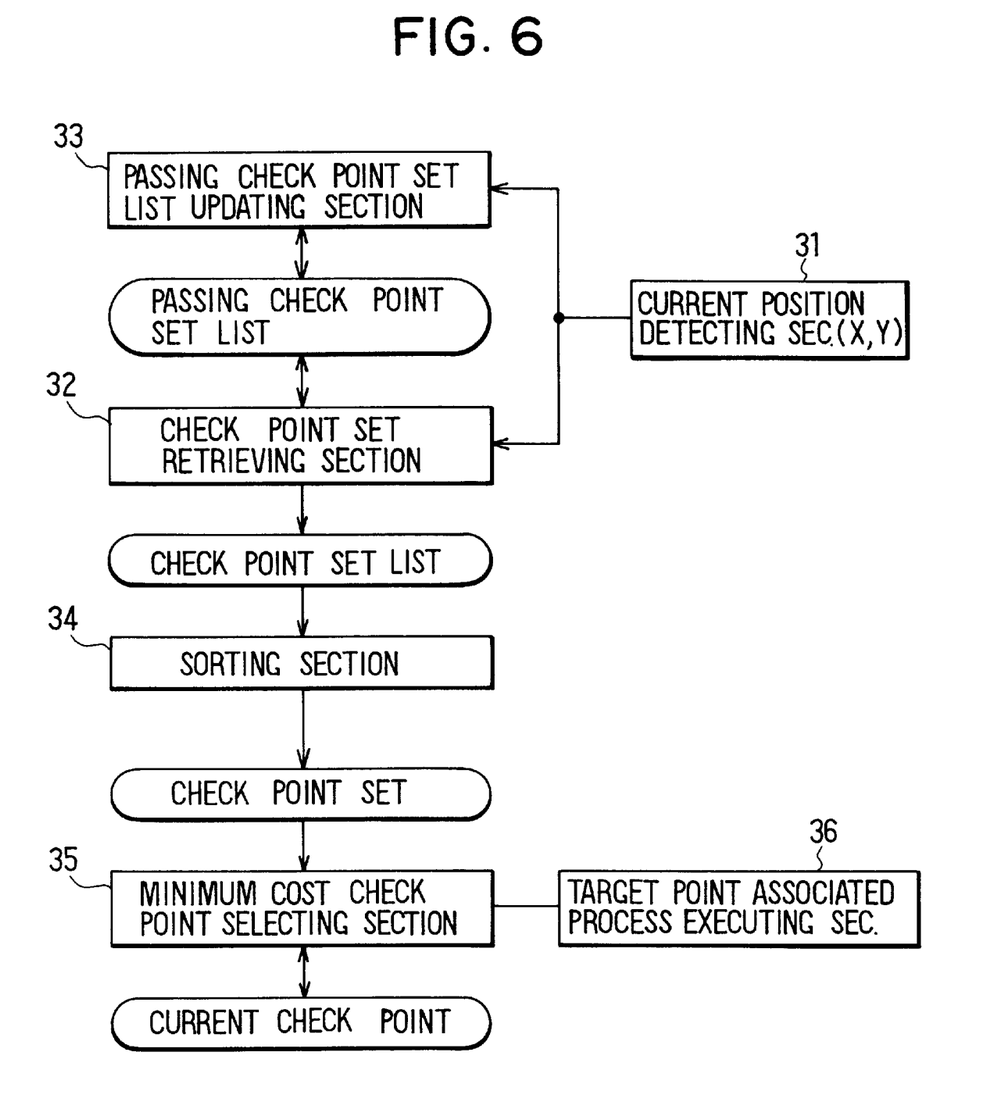
FIG. 6 is a diagram showing a functional block structure in an ECU in FIG. 1 for detecting a check point.

FIG. 6 shows a functional block structure for detecting the check point and for executing the associated processes by the ECU 3. It is noted that rectangular blocks represent processes to be executed by the ECU 3 and round-cornered blocks represent data to be stored in the memory section 3c.

A current point detecting section 31 finds the current position of the snowplow based on each signal from the sensor section 1 and outputs a current position coordinate (X, Y) each a predetermined time, e.g. one second. A check point set retrieving section 32 retrieves a check point set to which the snowplow is approaching based on the current position coordinate (X, Y) and the coordinate of the check point set.

Figure 7:
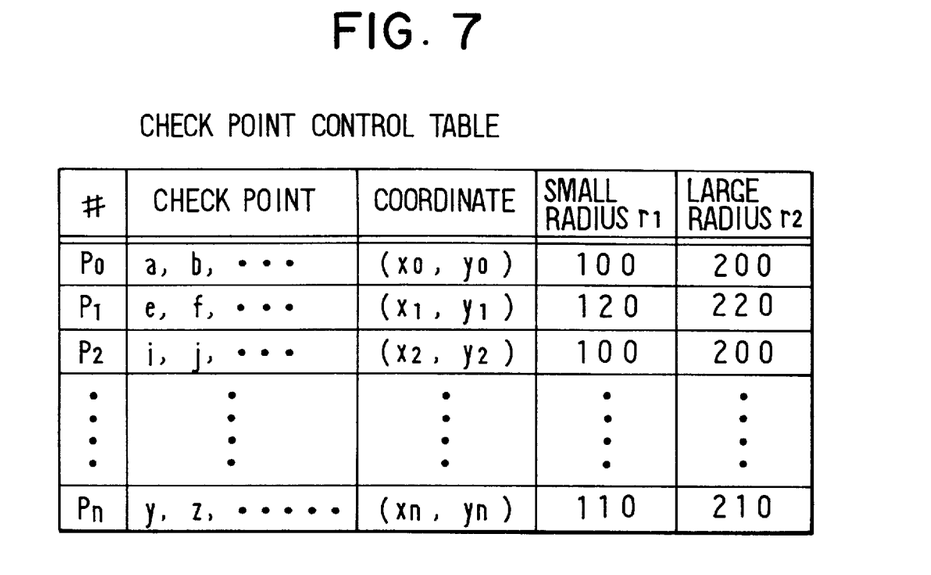
FIG. 7 shows a check point control table.

In this case, data of the check point set is stored in a form of a check point control table shown in FIG. 7. That is, with respect to each of check point sets $P_0, P_1, \ldots, P_n$, check points contained in the check point set, the coordinate of the check point set, a small radius $r_1$ and a large radius $r_2$ are stored in a form of a table. It is noted that the small radius $r_1$ and the large radius $r_2$ are set per each check point set and may be set at different values for each of the check point sets.

Figure 8:
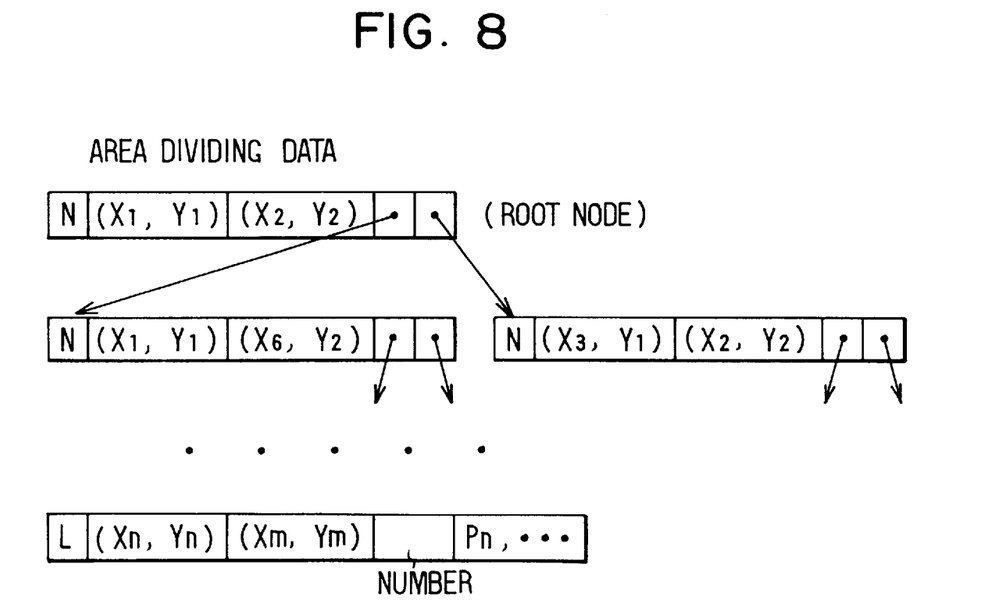
FIG. 8 shows a tree data structure in dividing an area.

The check point set is retrieved from area dividing data having a hierarchical structure. That is, this area dividing data has a tree data structure in which each of areas which is subdivided one after another from a large area is specified by way of coordinate as shown in FIG. 8. The area dividing data of this tree data structure is composed of non-leaf node records and leaf node records which are discriminated by a value of a head item indicating a record type. Specifically, the non-leaf node record is marked with "N" and the leaf node record is marked with "L". The non-leaf node record represents data of an area on the way to the lowest level area and the leaf node record represents data of the lowest level area. The non-leaf node record is composed of a coordinate specifying that area and pointer addresses (denoted by black points "•" in the figure) of divisional areas obtained by dividing that area. The leaf node record is composed of a coordinate specifying that area, a number of check point sets contained in that area and a list of the check point sets.

The structure of the area dividing data will be explained by exemplifying a case when an area is divided in two steps with reference to FIGS. 9 through 11.

Figure 9A:
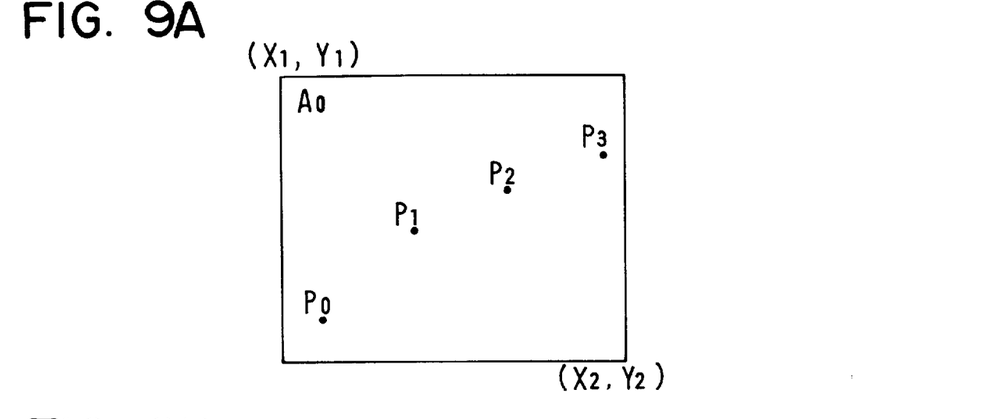
FIGS. 9A and 9B are diagrammatic views for explaining a data structure for an area $A_0$.

At first, a largest rectangular area $A_0$ containing a plurality of check point sets $P_0$, $P_1$, $P_2$ and $P_3$ is set as shown in FIG. 9A. A record for this area $A_0$ is composed of "N" indicating that it is a non-leaf node record, coordinates $(X_1, Y_1)$ and $(X_2, Y_2)$ of two apexes located at the diagonal positions of the area $A_0$ and pointer addresses of divisional areas divided in the area $A_0$ as shown in FIG. 9B.

Figure 10A:
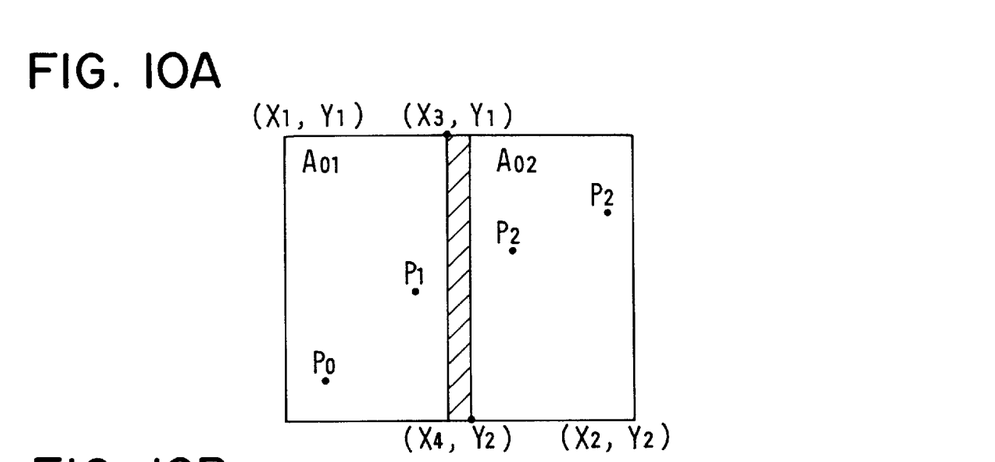
FIGS. 10A and 10B are diagrammatic views for explaining data structures for divisional areas $A_{01}$ and $A_{02}$ obtained by dividing the area $A_0$ into two parts.
Figure 10B:
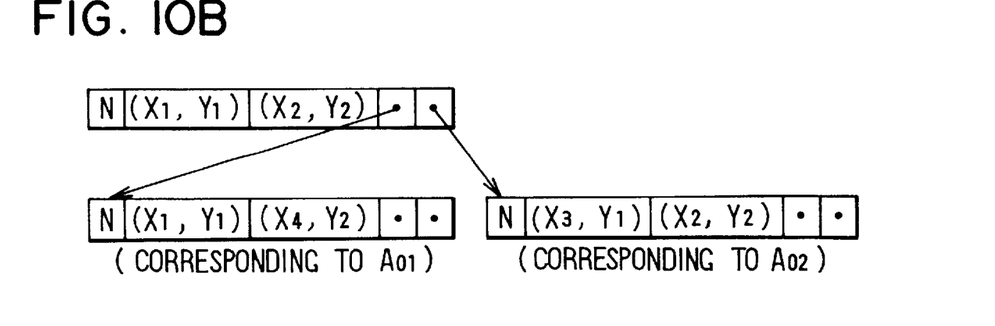

Next, divisional areas $A_{01}$ and $A_{02}$ obtained by dividing the area $A_0$ into two parts are set as shown in FIG. 10A and a record for each of the divisional areas $A_{01}$ and $A_{02}$ is composed of "N" indicating that it is a non-leaf node record, coordinates of diagonal positions of the area and pointer addresses of divisional areas obtained further by dividing that area as shown in FIG. 10B.

Figure 11A:
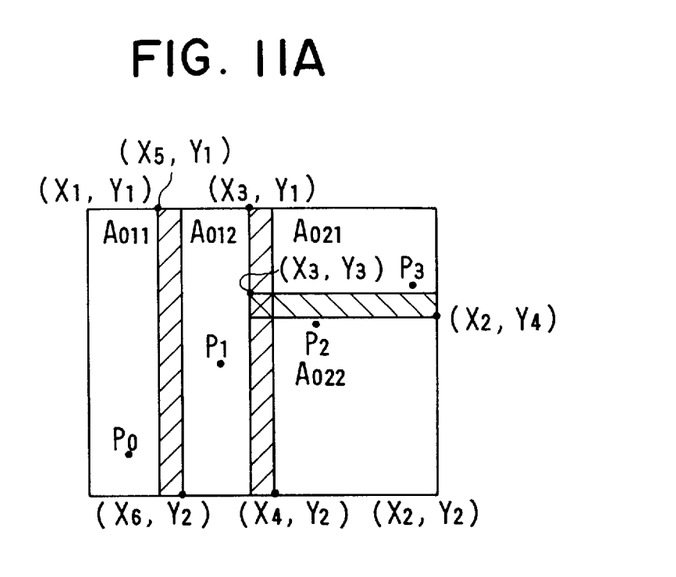
FIGS. 11A and 11B are diagrammatic views for explaining data structures for divisional areas $A_{011}$, $A_{012}$, $A_{021}$, and $A_{022}$ obtained by dividing the areas $A_{01}$ and $A_{02}$ into two parts, respectively.

Further, divisional areas $A_{011}$, $A_{012}$, $A_{021}$, and $A_{022}$ obtained by respectively dividing the areas $A_{01}$ and $A_{02}$ into two parts are set as shown in FIG. 11A. A record for each of the divisional areas $A_{011}$, $A_{012}$, $A_{021}$ and $A_{022}$ is composed of "L" indicating that it is a leaf node record, coordinates of diagonal positions of that area, a number of check point sets contained in that area and a list of check point sets as shown in FIG. 11B.

Figure 9B:
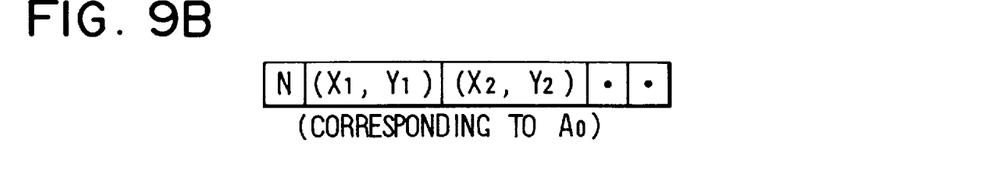
Figure 11B:
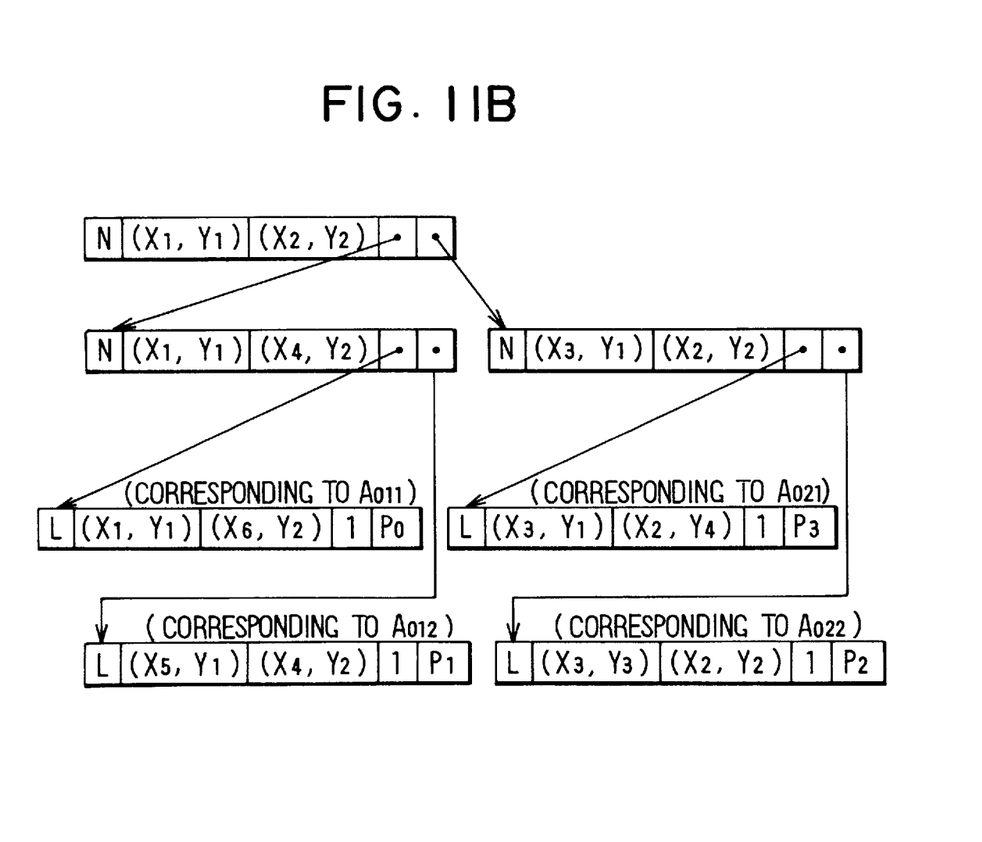
Figure 12:
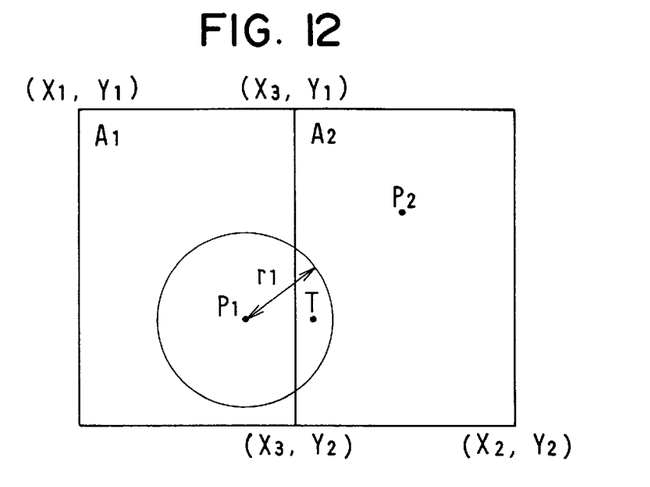
FIG. 12 is a diagrammatic view for explaining a problem occurring when the divisional areas are not overlapped.

It is noted that the divisional areas are overlapped as indicated by hatched parts in FIGS. 9 through 11 in dividing the areas as described above. It is because, when the area is divided without providing the overlapped area as shown in FIG. 12 and when the current vehicle position T is located in the area $A_2$ around the divided position and the check point set $P_1$ is located within the area $A_1$, it is unable to determine that the current vehicle position T has approached to the check point set $P_1$ even if the current vehicle position T has entered within the range of a small radius $r_1$ from the check point set $P_1$.

Figure 13A:
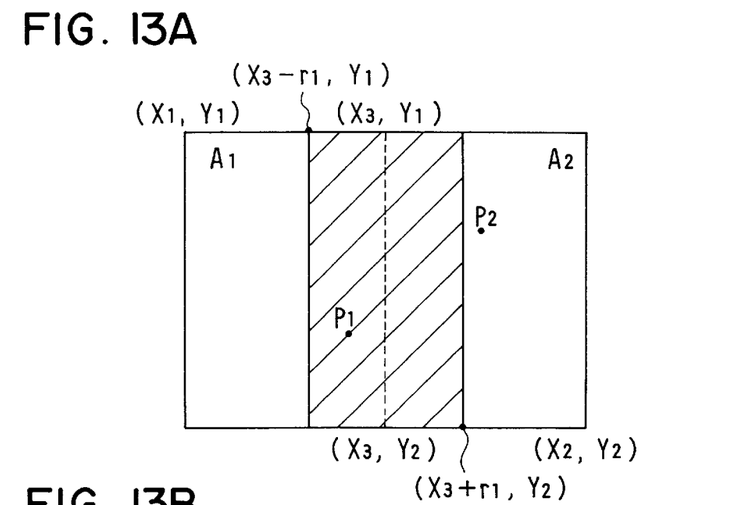
FIGS. 13A and 13B are diagrammatic views for explaining data structures when the divisional areas are overlapped.
Figure 13B:
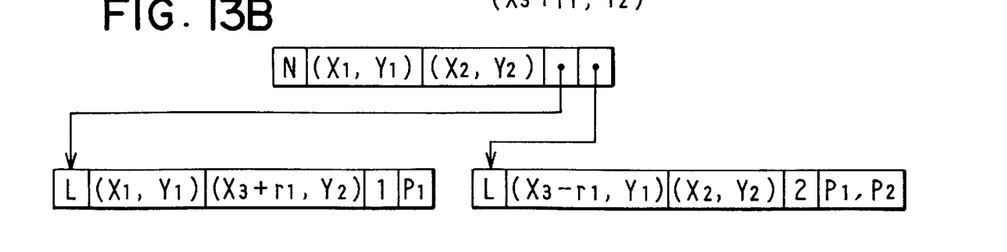

Then, an overlapped area is set such that the respective divisional areas have a margin by the small radius $r_1$ to eliminate the problem described above. It is noted that the small radius $r_1$ in providing the overlapped area shall be a maximum value among small radii set for each of the check point sets ($P_1$ and $P_2$ in case of FIG. 13) contained in the area to be divided.

The check point set retrieving section 32 described above retrieves a check point set to which the snowplow is approaching by using the current position coordinate (X, Y), the data of the check point control table shown in FIG. 7 and the area dividing data shown in FIG. 8. The process of the check point set retrieving section 32 will be explained in detail in accordance to flow charts shown in FIGS. 14 and 15. It is noted that in the following description, a record for the largest area, e.g. the area $A_0$ shown in FIG. 9A, will be designated as a root node and a record for each divisional area divided from that area will be designated as a child node. Further, the non-leaf node record is designated as a non-leaf node and the leaf node record as a leaf node.

Figure 14:
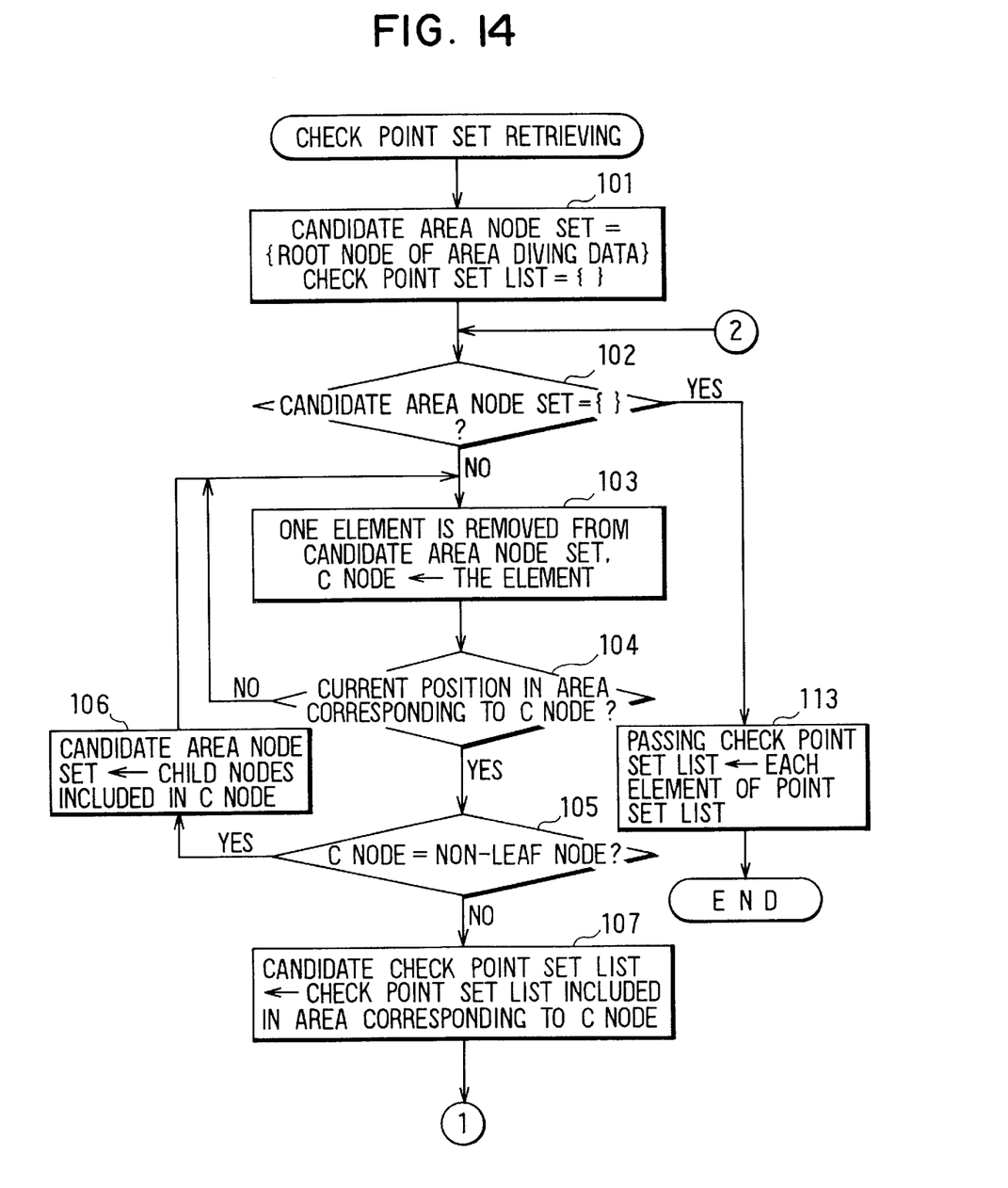
FIG. 14 is a flow chart showing a check point set retrieving process executed by a check point set retrieving section in FIG. 6.

At first, as an initial setting, a root node of the area dividing data is set as a candidate area node set and a check point set list is caused to be blank in Step 101. Next, it is determined whether a candidate area node set is blank in Step 102.

Because the root node has been set as the candidate area node set in the initial setting, it is determined to be NO at the first arrival. Next, one element is selected from the candidate area node set and is designated as C node in Step 103. The selected element is taken away from the candidate area node set. In this case, the root node is the C node. Then, it is determined whether or not the current vehicle position is located within an area corresponding to the C node in Step 104. Because each node is specified by the coordinates of the diagonal positions of the area as described above, it is possible to determine whether the current vehicle position is located within the area corresponding to the C node by comparing the coordinates of the diagonal positions with the current position coordinate (X, Y). It is noted that it is determined to be YES in a case where the root node is the C node because the root node includes the whole area.

It is then determined whether or not the C node is a non-leaf node in Step 105. Because the root node is a non-leaf node, it is determined to be YES and child nodes contained in the C node is added to the candidate area node set in Step 106. In this case, the child nodes specified by the point addresses of the root node are added to the candidate area node set. After that, the processes from Steps 103 through 105 are implemented sequentially on the child nodes thus added to the candidate area node set. That is, an element (one child node in this case) is selected from the candidate area node set and set as the C node. As described above, the selected element (child node) is removed from the candidate area node set. It is determined whether or not the current vehicle position is located within an area corresponding to the C node. Another element is designated as the C node by returning to Step 103 when the current vehicle position is not located within the area corresponding to the current C node. When the current vehicle position is located within the area corresponding to the C node, it is determined whether or not the C node is a non-leaf node. When it is a non-leaf node, child nodes contained in that C node are added to the candidate area node set.

Figure 15:
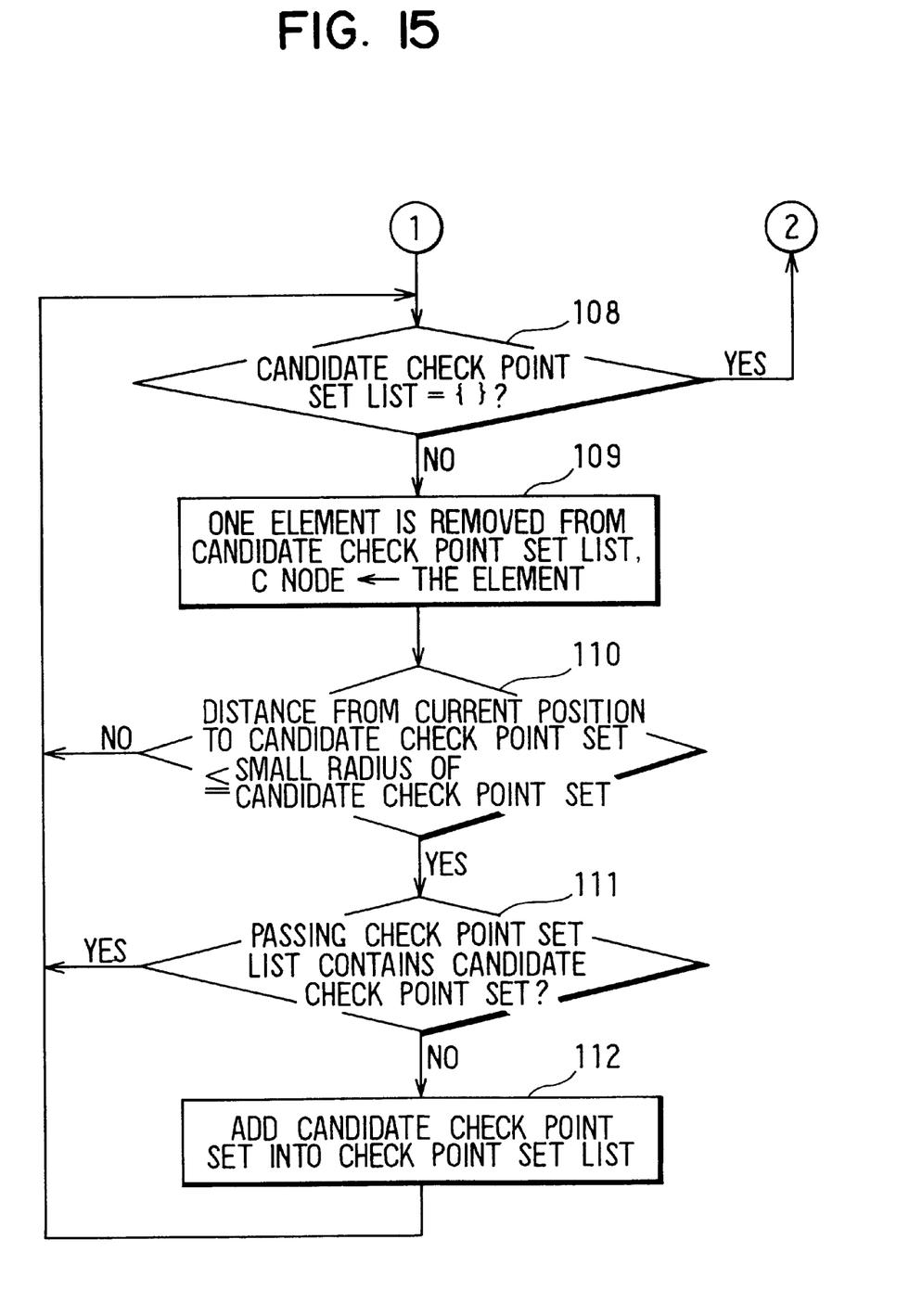
FIG. 15 is a flow chart showing the process continued from FIG. 14.

In this way, the areas of different levels containing the current vehicle position are specified one after another. When the C node which contains the current vehicle position within its area is a leaf node, it is determined to be NO in Step 105 and a check point set list contained within the area corresponding to that C node is designated as a candidate check point set list in Step 107. Then, a process shown in FIG. 15 is executed on this candidate check point set list.

At first, it is determined whether or not the candidate check point set list is blank in Step 108. Because the candidate check point set list has been just set in this case, it is determined to be NO. Then, one element is selected from the candidate check point set list to designate that element as a candidate check point set in Step 109. It is noted that the selected element is removed from the candidate check point set list. Then, the coordinate and the small radius $r_1$ of the candidate check point set are extracted from the check point control table shown in FIG. 7. A distance from the current vehicle position to the candidate check point set is calculated and it is determined whether or not the distance is less than the small radius $r_1$ in Step 110. When the distance from the current vehicle position to the candidate check point set is greater than the small radius $r_1$, the process returns to Step 108 and the same process is repeated to another candidate check point set as long as the candidate check point set list is not empty.

When the distance from the current vehicle position to the candidate check point set is less than the small radius $r_1$, it is determined whether or not the candidate check point set is contained in a passing check point set list in Step 111. The passing check point set list is a list of check point sets where the snowplow is passing nearby from when the current position is determined to have entered within the range of the small radius $r_1$ from each of the check point sets till when it gets out of the range of the large radius $r_2$ from each of the check point sets and is determined to have been passed. When the candidate check point set is not contained in the passing check point set list, a candidate check point set is added to the check point set list in Step 112.

Accordingly, in the above-mentioned Steps 110 through 112, it is determined that the current vehicle position has entered within the range of the small radius $r_1$ from the check point set, i.e. the snowplow is approaching to the check point set, and the check point set is added to the check point set list only when such a determination is made.

Then, the above-mentioned processes are implemented to all the candidate check point set contained in the candidate check point set list. The process returns to Step 102 when the candidate check point set list becomes empty. The above-mentioned processes are repeatedly executed as long as a node is left in the candidate area node set. When the candidate area node set becomes empty, the process advances from Step 102 to Step 113 to add elements of the check point set list to the passing check point set list.

Accordingly, a list of check point sets which the current vehicle position is determined to be approaching is established and is added to the passing check point set list by executing the processes shown in FIGS. 14 and 15 (see FIG. 6).

In FIG. 6, a passing check point set list updating section 33 determines whether or not the current vehicle position is distant from the respective check point sets by more than the distance of the large radius $r_2$ based on the current position coordinate (X, Y) and the coordinates of the check point sets contained in the passing check point set list every time when the current position coordinate (X, Y) is outputted from the current point detecting section 31. Then, it deletes a check point set from which the current position is distant by more than the distance of the large radius $r_2$ from the passing check point set list to update the passing check point set list.

A sorting section 34 sorts the check point sets in the check point set list in order of distance from what is closer to the current vehicle position.

A minimum cost check point selecting section 35 takes out one check point set from the sorted check point set list, calculates costs of the respective check points contained in that check point set with respect to the check point detected in the last time (current check point). The minimum cost check point selecting section 35 selects a check point whose cost is minimum. In detail, it selects a check point whose moving cost is minimum by using a movable relation table shown in FIG. 16, setting the current check point as a starting point and the respective check points contained in the check point set as ending points, and calculating the moving cost with respect to the respective check points having a moving path which permits to move from the starting point to the ending point directly or indirectly. The selected check point is set as a new current check point.

Figure 17:
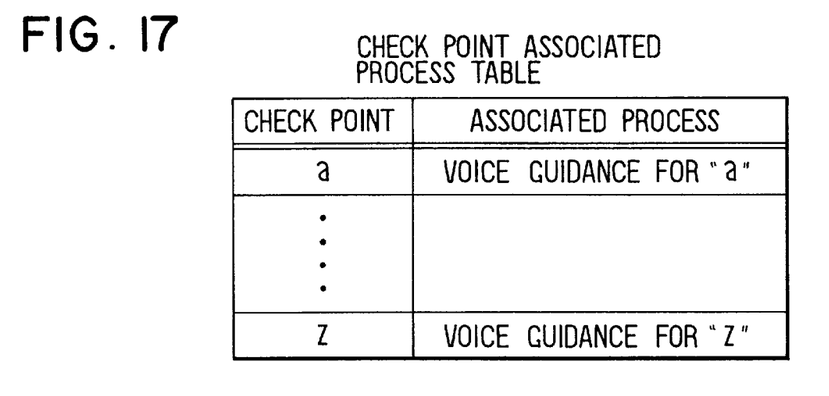
FIG. 17 shows a check point associated process table.

A check point associated process executing section 36 performs the associated processes for the selected check point by generating voice for guidance from the speaker 5b and by automatically sampling operation records for example, in accordance to a check point associated process table shown in FIG. 17. The operation record automatically sampled is transmitted from the telecommunication section 6 to the base station 7.

It is noted that the minimum cost check point selecting section 35 and the check point associated process executing section 36 repeat the above-mentioned processes to all the sorted check point sets in order of distance from what is closer to the current point.

As described above, according to the present embodiment, when it is determined that the snowplow has approached any one of the check point sets based on the coordinate of the current vehicle position and the coordinate of the check point set, the next check point is detected among check points of that check point set based on the relation with the current check point detected in the last time. The associated processes such as the voice guidance and the automatic sampling of the operation record for that check point are performed. Accordingly, it is possible to give the voice guidance for the snow dumping prohibited sections and the bridge joint sections shown in FIGS. 3 and 4 and to write the operation record automatically at such check points.

Figure 18:
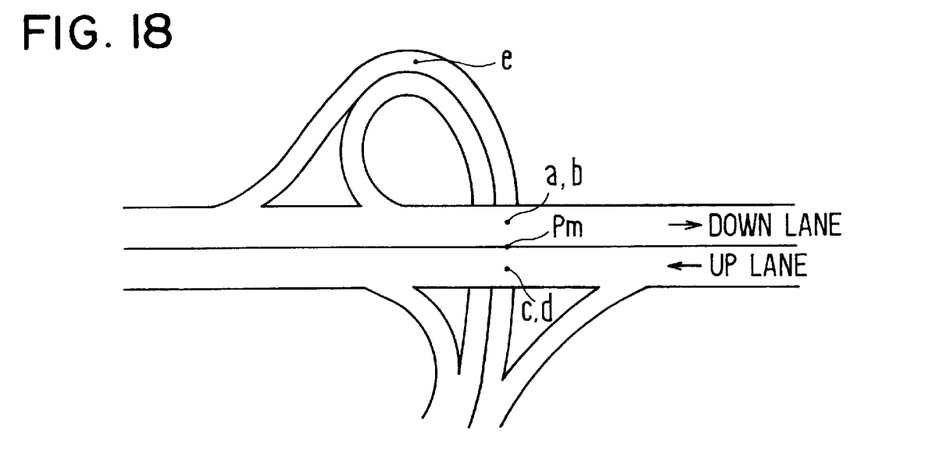
FIG. 18 is a diagrammatic view for explaining a case when a check point set is set on the main lane of an expressway at a ramp.

When a check point set Pm composed of check points (a) and (c) on the main lane of an expressway and of check points (b) and (d) on a ramp is set as shown in FIG. 18, there is a possibility that the system performs the associated processes for the check points (a) or (c) when the snowplow runs on the ramp and enters within the small radius $r_1$ from the check point set Pm. However, it is possible to prevent the associated processes from being erroneously performed by arranging such that the check point (b) or (d) is detected in connection with a check point (e) detected in the last time when the snowplow has run on the ramp and no associated processes for the check point (a) or (c) is performed.

Further, although it is possible to determine that the snowplow has approached any one of check point sets by comparing the coordinate of the current vehicle position with coordinates of the check point sets individually, it takes much time in the comparison in such a case. However, the present embodiment allows the area where the current point belongs to be quickly retrieved by using the area dividing data having the hierarchical data structure shown in FIG. 8. For instance, when an area is divided into $2^n$ parts, the lowest level area where the current point belongs may be retrieved by n times of retrieval. Further, because the approach to the check point set contained in the lowest level area where the current point belongs only needs to be determined, the time necessary for that determination may be shortened remarkably.

Figure 16:
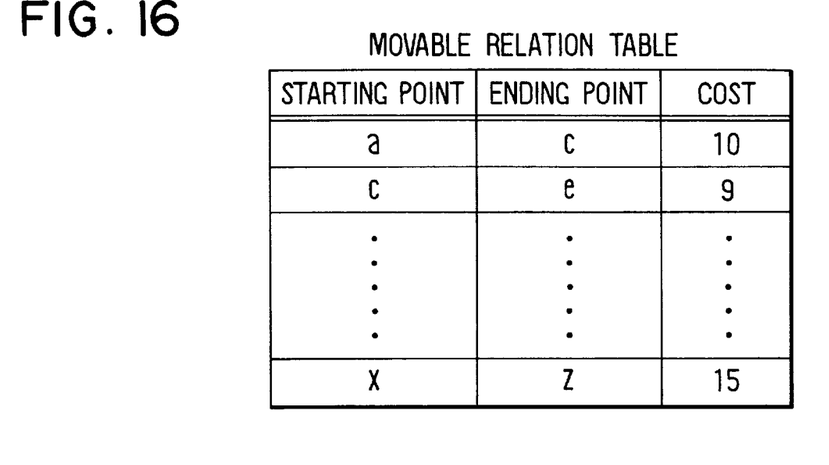
FIG. 16 shows a movable relation table.

It is noted that respective data of the check point control table shown in FIG. 7, the area dividing data having a hierarchical structure shown in FIG. 8, the movable relation table shown in FIG. 16 and the check point associated process table shown in FIG. 17 are stored in the memory card 4a. It is also possible to arrange so as to receive such data from the base station 7 via the telecommunication section 6 and to store such data in the memory section 3c.

Further, although the above-mentioned embodiment has shown the case of using the voice guidance as means for informing the driver of that the snowplow has approached to the check point, it is possible to indicate any signs showing the approach on a front glass for example. Still more, the associated processes for the check point such as the snow dumping prohibited section or the bridge joint may include an automatic control of the snowplow for the check point, in addition to the voice guidance and the automatic sampling of operation record. That is, it is possible to arrange so as to automatically control the snowplow by lifting the snowremoving machine at the bridge joint for example.

What is claimed is:

1. A vehicular operation processing system which performs an associated process for a check point when a vehicle approaches the check point, said operation processing system comprising:

deriving means for deriving a current vehicle position;

storing means for storing coordinates of a plurality of check point sets; and processing means for, when determining that the vehicle is approaching any one of the plurality of check point sets based on the current vehicle position and the coordinate of the check point set, detecting a next check point based on a relationship between each check point contained in the check point set and a check point previously detected and performing the associated process for the next check point, wherein said processing means performs automatic sampling of operation record as the associated process for the check point.

2. A vehicular operation processing system according to claim 1, wherein said processing means determines that the vehicle is approaching the check point set when the current vehicle position enters within a first distance from the coordinate of the check point set.

3. A vehicular operation processing system according to claim 2, wherein said processing means determines that the vehicle has passed through the check point set when the current vehicle position is more than a second distance away which is greater than the first distance from the coordinate of the check point set.

4. A vehicular operation processing system according to claim 2, wherein the first and second distances are individually set for each of the check point sets.

5. A vehicular operation processing system according to claim 1, wherein said processing means detects the next check point based on cost calculation between each of check points contained in the check point set and a previously detected check point.

6. A vehicular operation processing system according to claim 1, wherein the vehicle is a snowplow, the check point is set on a snow dumping prohibited section, and said processing means performs the associated process for the snow dumping prohibited section when determining that the snowplow is approaching the snow dumping prohibited section.

7. A vehicular operation processing system according to claim 1, wherein the vehicle is a snowplow, the check point is set on a bridge joint, and said processing means performs the associated process for the bridge joint when determining that the snowplow is approaching the bridge joint.

8. A vehicular operation processing system according to claim 1, wherein said processing means gives a caution to a driver as the associated process for the check point.

9. A vehicular operation processing system according to claim 1, wherein said processing means give a voice guidance as the associated process for the check point.

10. A vehicular operation processing system which performs an associated process for a check point when a vehicle approaches the check point, said operation processing system comprising:
   deriving means for deriving a current vehicle position;
   storing means for storing coordinates of a plurality of check point sets; and
   processing means for, when determining that the vehicle is approaching any one of the plurality of check point sets based on the current vehicle position and the coordinate of the check point set, detecting a next check point based on a relationship between each check point contained in the check point set and a previously detected check point and performing the associated process for the next check point,
   wherein said storing means stores hierarchical structure data in which respective small areas obtained by subdividing a predetermined area are specified by coordinates and the check point set corresponds to a subdivided lowest level area, and said processing means retrieves the check point set in an area to which the current vehicle position belongs using the hierarchical structure data and the current vehicle position and determines that the vehicle has approached the check point set based on the coordinate of the check point set retrieved and the current vehicle position.

11. A vehicular operation processing system according to claim 10, wherein said subdivided lowest level area is stored in said storing means in such a manner that adjacent two areas have an overlapped area.

12. A vehicular operation processing system according to claim 11, wherein said processing means determines that the vehicle is approaching the check point set when the current vehicle position enters within a first distance from the coordinate of the check point set and a width of said overlapped area is equal to the first distance.

13. A vehicular operation processing system according to claim 12, wherein the first distance is set to be shorter than a distance from a coordinate of a check point set to a main road when the check point set is established on a ramp extending from the main road.

14. A vehicular operation processing system which performs an associated process for a check point when a vehicle approaches the check point, said operation processing system comprising:
   deriving means for deriving a current vehicle position;
   storing means for storing coordinates of a plurality of check point sets; and
   processing means for, when determining that the vehicle is approaching any one of the plurality of check point sets based on the current vehicle position and the coordinate of the check point set, detecting a next check point based on a relationship between each check point contained in the check point set and a previously detected check point and performing the associated process for the next check point,
   wherein when the check point set includes a check point on a main road and a check point on a ramp branching from the main road and solidly crossing the main road, the check point on the main road substantially coinciding with the check point on the ramp, the next check point is detected from the check point on the main road and the check point on the ramp with the previously detected check point.

15. A vehicular operation processing system which performs an associated process for a check point set on a snow dumping prohibited section when a snow plow approaches the check point, said operation processing system comprising:
   deriving means for deriving a current vehicle position;
   storing means for storing coordinates of a plurality of check point sets; and
   processing means for, when determining that the snow plow is approaching the snow plow dumping prohibited section based on the current vehicle position and the coordinate of the check point set, detecting a next check point based on a relationship between each check point contained in the check point set and a previously detected check point and performing the associated process for the next check point, wherein
   said snow dumping section is set on a place where there is a solid crossing of two roads.

16. A vehicular operation processing system for a snowplow, comprising:
   detecting means for detecting a current vehicle position; and
   processing means for, when determining that the snowplow is approaching a snow dumping prohibited section based on the current vehicle position, performing an associated process for the snow dumping prohibited section,
   wherein said processing means performs automatic sampling of operation record as the associated process for the snow dumping prohibited section.

17. A vehicular operation processing system according to claim 16, wherein said snow dumping prohibited section is set on a place where there is a solid crossing of two roads.

18. A vehicular operation processing system according to claim 16, wherein said processing means informs the a driver of the snow dumping prohibited section as the associated process for the snow dumping prohibited section.

19. A vehicular operation processing system according to claim 18, wherein said processing means give a voice guidance to inform the driver of the snow dumping prohibited section as the associated process for the snow dumping prohibited section.

20. A vehicular operation processing system for a snowplow, comprising:
   detecting means for detecting a current vehicle position; and
   processing means for performing an associated process for the bridge joint, when determining that the snowplow is approaching to a bridge joint based on the current vehicle position,
   wherein, when the processing means determines that the snowplow has approached the bridge joint based on the current vehicle position, the processing means outputs information regarding the approach of the snowplow to the bridge joint so as to lift a snow removing machine before the snowplow reaches the bridge joint.

21. A vehicular operation processing system according to claim 20, wherein said processing means informs a driver of the bridge joint as the associated process for the bridge joint.

22. A vehicular operation processing system according to claim 20, wherein said processing means give a voice guidance to inform the driver of the bridge joint as the associated process for the bridge joint.

23. A vehicular operation processing system according to claim 20, wherein said processing means lifts a snowremoving machine as the associated process for the bridge joint.

24. A vehicular operation processing system for a snowplow, comprising:

detecting means for detecting a current vehicle position; and processing means for, when determining that the snowplow has approached a bridge joint based on the current vehicle position, performing an associated process for the bridge joint, wherein said processing means performs automatic sampling of an operation record as the associated process for the bridge joint.

25. A vehicular operation processing system according to claim 24, wherein said processing means give a voice guidance to inform the driver of the bridge joint as the associated process for the bridge joint.

26. A vehicular operation processing system according to claim 24, wherein said processing means lifts a snow removing machine as the associated process for the bridge joint.

27. A vehicular operation processing system which performs an associated process for a check point when a vehicle approaches the check point, said operation processing system comprising:

deriving means for deriving a current vehicle position;

storing means for storing hierarchical structure data in which respective small areas obtained by sequentially subdividing a predetermined area are specified by coordinates and a check point set is included in a subdivided lowest level area; and processing means for, when determining that the vehicle is approaching any one of check point sets based on the current vehicle position and the coordinates of the check point sets in an area to which the current vehicle position belongs, detected by using the hierarchical structure data and the coordinate of the current vehicle position, detecting a next check point from check points contained in that check point set and performing the associated process for the next check point.

28. A vehicular operation processing system which performs an associated process for a check point when a vehicle approaches the check point, said operation processing system comprising:

a storage element that stores hierarchical structure data in which respective small areas obtained by sequentially subdividing a predetermined area are specified by coordinates and a check point set is included in a subdivided lowest level area.

29. A processing system a vehicle check point comprising:

a sensing unit that determines a current vehicle position;

a storage unit that stores coordinates of a plurality of check point sets; and a processor which, when determining that a vehicle is approaching any one of the plurality of check point sets based on the current vehicle position and the coordinate of the approached check point set, detects a next check point based on a relationship between each check point contained in the approached check point set and a previously detected check point and performs an associated process for the next check point, wherein said storage unit stores hierarchical structure data in which respective small areas obtained by subdividing a predetermined area are specified by coordinates and the approached check point set corresponds to a subdivided lowest level area, and said processor retrieves a check point set in an area to which the current vehicle position belongs using the hierarchical structure data and the current vehicle position and determines that the vehicle is approaching the approached check point set based on the coordinate of the check point set retrieved and the current vehicle position.

30. A processing system which performs an associated process for a vehicle check point, said processing system comprising:

a sensing unit that determines a current vehicle position;

a storage unit that stores coordinates of a plurality of check point sets; and a processor which, when determining that the vehicle is approaching any one of the plurality of check point sets based on the current vehicle position and the coordinate of the approached check point set, detects a next check point based on a relationship between each check point contained in the approached check point set and a previously detected check point and performs an associated process for the next check point, wherein said processor performs automatic sampling of an operation record as the associated process for the approached check point.

31. A processing system for a snowplow, comprising:

a detector that detects a current vehicle position; and a processor which, when determining that the snowplow is approaching a snow dumping prohibited section based on the current vehicle position, performs an associated process for the snow dumping prohibited section, wherein said processor performs automatic sampling of an operation record as the associated process for the snow dumping prohibited section.

32. A processing system for a snowplow, comprising:

a detector that detects a current vehicle position; and a processor that performs an associated process for a bridge joint when determining that the snowplow is approaching the bridge joint based on the current vehicle position, wherein the processor outputs information regarding the approach of the snowplow to the bridge joint based on the current vehicle position so as to lift a snow removing machine before the snowplow reaches the bridge joint.

33. A processing system for a snowplow, comprising:

a detector that detects a current vehicle position; and a processor which, when determining that the snowplow is approaching a bridge joint based on the current vehicle position, performs an associated process for the bridge joint, wherein said processor performs automatic sampling of an operation record as the associated process for the bridge joint.

* * * * *